United States Patent
Yamanaka et al.

[11] 3,871,491
[45] Mar. 18, 1975

[54] AXLE LOAD METER

[75] Inventors: Masami Yamanaka, Miki; Yasutoshi Masuda, Ashiya, both of Japan

[73] Assignee: Yamato Scale Company, Limited, Akashi-shi, Hyogo-ken, Japan

[22] Filed: May 28, 1974

[21] Appl. No.: 473,361

[30] Foreign Application Priority Data
Dec. 13, 1973 Japan............................ 48-140163

[52] U.S. Cl................................. 177/45, 177/134
[51] Int. Cl...................... G01g 23/18, G01g 19/02
[58] Field of Search...................... 177/45, 134, 135

[56] References Cited
UNITED STATES PATENTS
| | | | |
|---|---|---|---|
| 2,863,535 | 1/1959 | Ruge | 177/134 X |
| 3,406,771 | 10/1968 | Rogers | 177/134 X |

*Primary Examiner*—George H. Miller, Jr.

[57] ABSTRACT

A device for measuring vehicle loads including means for measuring the axle loads of the vehicle and means responsive to acceleration and deceleration of the vehicle and sounding an alarm or otherwise producing an indication that a change in velocity has exceeded the selected limit and that the measurement of the axle loads exceeds an allowable error.

1 Claim, 4 Drawing Figures

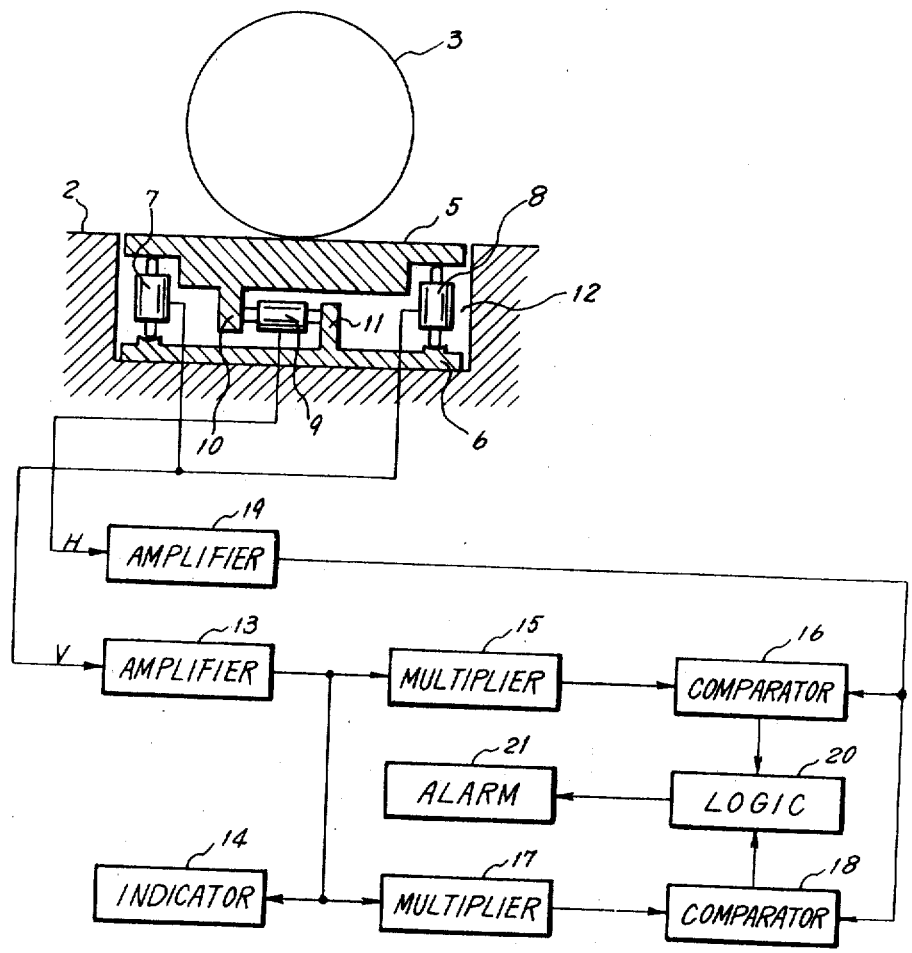

AXLE LOAD METER

This invention relates to an axle load meter for vehicles and more specifically to an alarm device for signaling undesired acceleration or deceleration of the vehicle being weighed.

There are many types of axle load meters known in the art which are used for weighing the axle loads of running vehicles such as automobiles. However, in order to obtain an accurate measurement, the vehicle must stand still or, at least, move at a constant speed on the measuring platform of the axle load meter, otherwise an error may occur in the measurement due to acceleration or deceleration. This error may be as large as 5% when the acceleration or deceleration is 0.15g (g being the acceleration of gravity) though there is some variation depending upon the type of vehicle.

Therefore, one object of this invention is to provide an improved axle load meter including an alarm device for detecting an excessive acceleration or deceleration of the running vehicle on the measuring platform and giving an alarm to indicate the need for another measurement.

According to this invention, the axle load meter includes a measuring platform over which a vehicle to be weighed is moved, means for detecting the vertical load applied to said platform to produce a first output representing said vertical load, means for detecting the horizontal force applied to said platform to produce a second output representing said horizontal force, means for calculating the ratio of said vertical load and said horizontal force from said first and second outputs, means for producing an alarm when said ratio is not within a predetermined range, and means for indicating said vertical load based upon said first output.

Principles and features of this invention will be described in detail hereinunder with reference to the accompanying drawings in which:

FIG. 3 is a schematic diagram, partly sectional and partly in block form, representing an embodiment of the device of this invention.

Throughout the drawings, like reference numerals are used to denote like components.

First, the principle of this invention will be described with reference to FIGS. 1 and 2.

Figure 1:
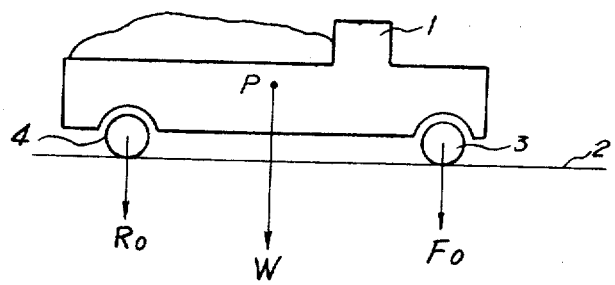
FIGS. 1 and 2 are schematic diagrams to aid in explanation of the principles of this invention.
Figure 2:
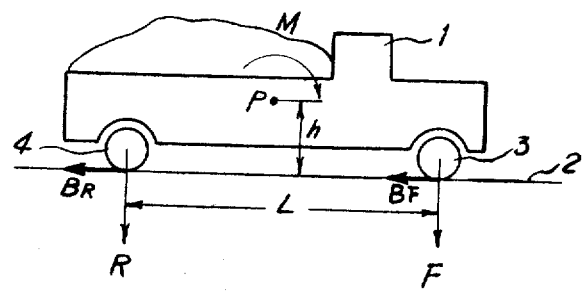

When an automobile 1 stands still or moves at a constant speed on a road surface 2, as shown in FIG. 1, vertical axle loads $F_0$ and $R_o$, which are components of the total weight W of the automobile 1 ($W = F_0 + R_0$), are applied to the road surface 2 by the front wheels 3 and the rear wheels 4 respectively, but no horizontal force appears. However, when the automobile 1 is braked, the front wheels 3 and the rear wheels 4 apply inertial forces to the road surface 2 and receive braking forces $B_F$ and $B_R$ respectively from the road surface 2 as the reactive forces. Accordingly, a moment M ($M = (B_F + {_{BR}})h$) appears about the center of gravity P, where h is the height of the center gravity P from the road surface 2. Due to this moment M, the front axle load increases and the rear axle load decreases contrarily, the resultant axle loads F and R being given by the following equations.

$$F = F_0 + {_F}'$$
$$R = R_0 - {_R}'$$

where $$F' = R' = M/L = (B_F = {_{BR}})h/L$$

where L is the span between the front and rear axles of the automobile 1. In the case of acceleration, the front axle load decreases and the rear axle load increases. In any case, it is obvious from the above equations that the greater the acceleration or deceleration, the greater the variation of the axle load, because the forces $F_F$ and $B_R$ are porportional to the acceleration or deceleration. In practice, the variation of the axle load may reach 25 percent to 30 percent when the automobile is accelerated or braked abruptly. In such case, therefore, the true axle loads $F_0$ and $R_0$ are not obtainable simply from the measurement of the vertical loads F and R.

The horizontal forces $B_F$ and $B_R$ are inertial forces and are proportional to the acceleration or deceleration and, at the same time, to the mass of the automobile. As the vertical loads F and R are nearly proportional to the mass of the automobile, ratios $B_F/F$ and $B_R/R$ are indicative of the magnitude of acceleration or deceleration. Accordingly, by limiting the ratio $B_F/F$ or $B_R/R$ below a specific value, the acceleration or deceleration is limited below a corresponding maximum and, consequently, the measured axle load F or R is controlled within a specific tolerance. This invention is based upon such a concept. The axle load meter of this invention is provided with an alarm system arranged to measure and calculate the above ratio, compare it with a predetermined allowable maximum and produce an alarm when it exceeds the maximum. This maximum may be determined previously by experimental trials, for example, as 0.15.

Referring next to FIG. 3, the axle load meter of this invention includes a measuring platform 5 supported on a bed 6 through a pair of piezoelectric elements 7 and 8, such as load cells, for measuring the vertical load applied to the platform 5 and producing a corresponding output V. According to this invention, the device further includes a load cell 9 supported horizontally between two brackets 10 and 11, which extend respectively from the platform 5 and the bed 6, for measuring the horizontal force applied to the platform 5 and producing a corresponding output H. The assembly of these components is installed within a cavity 12 formed in the road surface 2 so that the surface of the platform 5 is substantially flush with the road surface 2.

The resultant output V from the vertical load cells 7 and 8 is amplified by an amplifier 13 and applied to an indicator 14 for indicating the magnitude of axle load in analog or digital fashion. The output of the amplifier 13 is further applied through a first multiplier 15 to a first comparator 16 and also through a second multiplier 17 to a second comparator 18. The multipliers 15 and 17 are arranged to multiply their inputs by positive and negative coefficients, respectively, having common absolute values corresponding to the above-mentioned allowable maximum of the ratios $B_F/F$ and $B_R/R$. Assuming this maximum as 0.15, for example, the coefficients of the first and second multipliers 15 and 17 are 0.15 and −0.15, respectively.

The output H of the horizontal load cell 9 is amplified by an amplifier 19 having the same amplification factor as the amplifier 13, and applied to the second inputs of the comparators 16 and 18, respectively. The system is arranged so that the output H of the horizontal load cell 9 becomes positive with acceleration and negative with deceleration and that the first and second comparators 16 and 18 are operated by the positive and negative second inputs, respectively. The comparison output of the comparator 16 or 18 is applied to a logic circuit 20, which forwards a control output to an alarm device 21 based upon the result of comparison to give alarm information.

For instance, when the automobile is accelerated, the positive output of the amplifier 19, which corresponds to the horizontal force $B_F$ (or $B_R$), actuates the comparator 16 to be compared with the output of the multiplier 15, which corresponds to the vertical load F (or R) multiplied by 0.15. If the output of the amplifier 19 is greater than the output of the multiplier 15, that is, if $B_F > 0.15F$ (or $B_R > 0.15R$), that is, the ratio $B_F/F$ or $B_R/R$ is greater than 0.15, the comparator 16 forwards the output to the logic circuit 20 and the alarm device 21 gives alarm information, such as ACCELERATION and ANOTHER MEASUREMENT, under control of the logic circuit 20. The indicator 14 may be arranged to interrupt indication under control of the logic circuit 20 in such a case and give an indication only when the alarm device 21 is not actuated.

In the case of deceleration, the absolute values of the negative outputs of the amplifier 19 and the second multiplier 17 are compared by the second comparator 18 in the same manner and, if excessive deceleration is detected, the logic circuit 20 actuates the alarm device 21 to give information, such as DECELERATION and ANOTHER MEASUREMENT.

Figure 4:
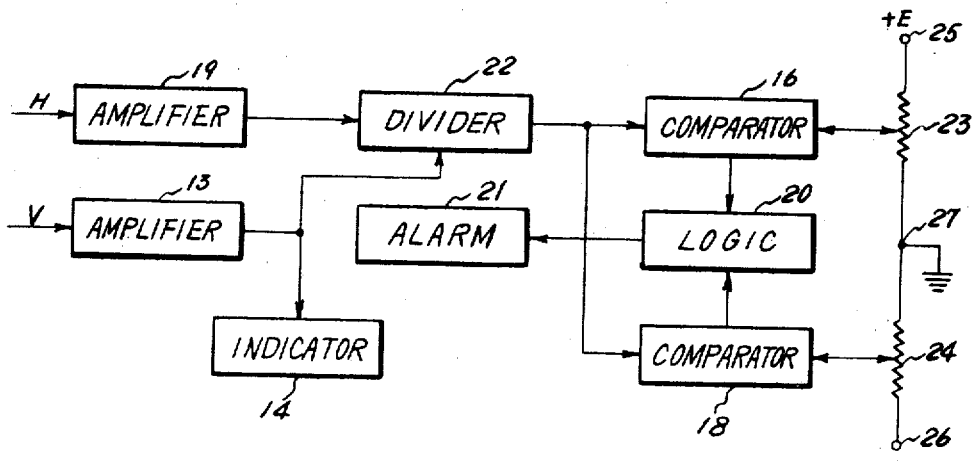
FIG. 4 is a block diagram representing a part of another embodiment of the device of this invention.

In the embodiment of FIG. 4, the output of the amplifier 13, which corresponds to the vertical load F or R, and the output of the amplifier 19, which corresponds to the horizontal force $B_F$ or $B_R$, are applied to a divider 22 and the ratio $B_F/F$ or $B_R/R$ is calculated therein. This ratio output is applied to one inputs of the comparators 16 and 18 having second inputs connected to the movable arms of a pair of potentiometers 23 and 24 connected in series between positive and negative terminals 25 and 26. The junction 27 of both potentiometers is grounded so that positive and negative voltages are respectively applied to the comparators 16 and 18. The absolute value of these positive and negative voltages is adjusted to correspond to the above-mentioned allowable maximum of the ratio, such as 0.15. If the absolute value of the ratio calculated by the divider 15 is greater than this maximum, the logic circuit 20 actuates the alarm device 21 in the same manner as in the device of FIG. 3.

As described above, any excessive acceleration or deceleration which may result in undesirable erroneous measurement can be detected and a suitable alarm is produced instantaneously, in accordance with this invention, so that another measurement may be advised quickly, as occasion demands.

What is claimed is:

1. An axle load meter, comprising a measuring platform on which a vehicle to be weighed runs, means for detecting a vertical load applied to said platform to produce a first output representing said vertical load, means for detecting a horizontal force applied to said platform to produce a second output representing said horizontal force, means for calculating a ratio of said vertical load and said horizontal force from said first and second outputs, means for producing an alarm when said ratio is not within a predetermined range, and means of indicating said vertical load based upon said first output.

* * * * *